US006258245B1

(12) United States Patent
Cifuentes et al.

(10) Patent No.: US 6,258,245 B1
(45) Date of Patent: Jul. 10, 2001

(54) COPPER LEACH PROCESS AIDS

(75) Inventors: Ricardo Arancibia Cifuentes, Santiago, CA (US); Donald C. Roe, Jamison, PA (US); Jorge Vergara Chavez; Andres Reghezza Inzunza, both of Chuquicamata (CL)

(73) Assignees: BetzDearborn Inc., Trevose, PA (US); Corporación Nacional del Cobre de Chile; a part interest ( * ) Notice: Subject to any disclaimer, the term of this patent is extended or adjusted under 35 U.S.C. 154(b) by 0 days.

(21) Appl. No.: 09/443,592

(22) Filed: Nov. 19, 1999

Related U.S. Application Data

(60) Provisional application No. 60/109,105, filed on Nov. 19, 1998.

(51) Int. Cl.$^7$ ...................................................... C25C 1/12
(52) U.S. Cl. ........................ 205/351; 205/580; 205/581; 205/583
(58) Field of Search ................................... 205/351, 580, 205/581, 583

(56) References Cited

U.S. PATENT DOCUMENTS 5,468,353 * 11/1995 Anich et al. ........................ 205/581

FOREIGN PATENT DOCUMENTS

488862 A1 * 6/1992 (EP) .

OTHER PUBLICATIONS

DEARCODOX, Development of a Reagent That Improves the Production, Quality and Environment in Hydrometallurgical Systems;Pincheria, Reghezza, Vergara, Arcos, Cifuentes, and Vergara; Expomin '98, IV International Conference on Clean Technologies for the Mining Industry; May, 1998; Santiago, Chile.

Development of a Reagent Which Improves The Behavior of Hydrometallurgical Systems; Pincheira, Reghezza, Vergara, Heller, Arcos, Cifuentes, and Vergara; Randol International Conference & Exhibition, Vancouver '98. No Month Available.

DEARCODOX Product Folder and Fact Sheet, BetzDearborn Inc.; May 1997.

* cited by examiner

Primary Examiner—Arun S. Phasge
(74) Attorney, Agent, or Firm—Steven D. Boyd

(57) ABSTRACT

A method for enhancing the operation of an acid solvent extraction and electrowinning operation by inhibiting acidic aerosol formation, allowing increased acid concentration and allowing higher operating temperature is disclosed wherein an antifoam formulation stable at a solution pH of about 1 to 2 is added. A preferred antifoam formulation comprises a glycol ester and an alkyl phenol ethoxylate in a paraffinic oil solvent added to the acid solution of an acid solvent extraction and electrowinning operation.

33 Claims, No Drawings

COPPER LEACH PROCESS AIDS

This application claims benefit of No. 60/109,105 filed Nov. 19, 1998.

FIELD OF THE INVENTION

The present invention provides methods for improving the unit operations employed in recovery of copper from copper ores in leaching operations.

BACKGROUND OF THE INVENTION

The use of sulfuric acid (pH about 1.5) to leach copper from copper bearing ores is well known. Such leach operations are useful in recovering copper for ores which include oxides of copper. The leach operation can be carried out in heaps, dumps, and vats or in situ. In such leach operations, the sulfuric acid is used to remove the copper from copper bearing ore which it contacts. The dilute copper bearing aqueous sulfuric acid solution is then subjected to a solvent extraction operation to extract and concentrate the copper. The solvent extracted copper is then stripped from the organic phase back into an aqueous phase. The chemical reaction involved in stripping is the reverse of the extraction process: $CuR_2 + H_2SO_4 \leftarrow\rightarrow Cu\ SO_4 + 2HR$. The aqueous phase is thereafter subjected to an electrowinning operation to recover the copper.

In heap leaching operations copper bearing ore from a mine may be crushed to produce an aggregate that is coarse enough to be permeable in a heap but fine enough to expose the copper metal values in the ore to the leaching solutions. After crushing, the ore is formed into heaps on impervious leach pads. A leaching solution of sulfuric acid is evenly distributed over the top of the heaps by sprinklers, wobblers or other similar equipment. As the barren leach solution percolates through the heap, it dissolves the copper contained in the ore. The leach solution collected by the impervious leach pad at the bottom of the heap is recovered and this pregnant solution is subjected to copper recovery operations (solvent extraction and electrowinning). Typically an agglomeration aid is added to the crushed ore and the so treated ore is agglomerated as with an agglomeration drum or by the action of conveyor belts. The agglomeration aids minimize the adverse effects of fines (i.e., −100 mesh components) on the heap leach operation.

In vat leach operations, copper bearing ores from a mine are crushed and placed in a large vat. The vat is filled with sulfuric acid which dissolves the copper oxides contained in the ore. The vat is drained and the "pregnant solution" subject to a copper recovery operation (solvent extraction and electrowinning).

In dump leach operations, copper bearing ore mounds, typically created by "dynamiting" an ore deposit, are sprayed with a sulfuric acid leach solution. The leach solution dissolves the copper oxides. Upon recovery, the leach solution is subjected to copper recovery operations (solvent extraction and electrowinning).

In in situ leach operations, underground copper bearing substrates are flooded with sulfuric acid leach solution. The leach solution is recovered and subjected to copper recovery operations (solvent extraction and electrowinning).

SUMMARY OF THE INVENTION

The present inventors discovered that the addition of a composition comprising an antifoam formulation such as a polyethylene glycol monooleate and an alkyl phenol ethoxylate in an oil solvent, to the sulfuric acid lixiviant in copper extraction operations significantly enhance such operations.

DESCRIPTION OF THE PREFERRED EMBODIMENTS

The present invention relates to a method of enhancing the electrowinning operation in copper leach mining operations. In such electrowinning operations, a copper rich aqueous, sulfuric acid solution is exposed to an electrical current in an electrolytic cell whereby copper plates out of solution onto the cathodes. In such electrolytic cells, bubbles form at the electrode surfaces. As these bubbles float to the surface of the solution and burst, a mist is created in the vicinity of the electrolytic cells. An acid mist can also form during drum agglomeration operations where crushed ore is treated with the acid leaching solution and agglomerated. The presence of such a mist in copper recovery operations where the solution is a sulfuric acid solution creates serious environmental, corrosion, and health and safety concerns.

In the past there have been attempts to control the formation of acid mist in electrowinning operations which employ acid solutions. For example, fluorosurfactants such as the FLUORAD FC-1100 series of products available from 3M have been added to sulfuric acid electrolyte solutions in electrowinning operations to control acid mist formation. The FLUORAD FC-1100 series are surfactants which lower the surface tension of the electrolyte. This reduced surface tension may result in smaller oxygen bubbles, but does not inhibit bubble formation. Fluorosurfactants have been widely used, however because of their high cost, the industry has a need for a more effective, less costly technology.

The present inventors have discovered that the addition of a low cost antifoam material as a solution treatment to the copper rich aqueous sulfuric acid solution prior to treatment in electrowinning cells significantly inhibits the formation of a mist in the vicinity of the electrowinning cells. The addition of the solution treatment to aqueous sulfuric acid leach solution employed as an agglomeration aid reduces acid mist during drum agglomeration and allows increased acid concentration and higher process temperatures. The solution treatment of the present invention comprises antifoam formulations which are believed to effect oxygen bubble formation in the electrolyte solution thereby inhibiting mist formation; i.e., the bubbles which form in a treated electrolyte solution break before reaching the surface or break before stable bubbles form on the surface.

Effective antifoam materials are those antifoams which are stable or remain active in acid solutions (pH=1–2) and which do not negatively impact the solvent extraction—electrowinning process or the recovered metal cathode quality.

Antifoam formulations in accordance with the present invention are those antifoam compositions stable in acid solutions (pH=1–2) such as sulfuric acid or antifoam compositions which decompose in acidic solutions to provide decomposition products which exhibit antifoam properties.

Suitable antifoam chemistries may include, but are not limited to: fatty amides such as ethylene bis-stearamide; fatty esters or glycol esters such as polyethylene glycol ditallate; polyglycols such as ethoxylatedi propoxylated alcohol; silicas such as fumed silica hydrophobed with silicone; silicones such as polydimethyl siloxane; wax dispersions such as paraffin wax emulsions; fatty acids such as stearic acid; fatty alcohols such as octadecanol; ethoxylated alkylphenols such as nonyl phenol ethoxylate; ethylene oxide/propylene oxide block copolymers or mixtures thereof.

The suitable antifoam formulation in accordance with the present invention can be formulated as: oil-based, that is the active antifoam dissolved in oil (paraffinic, naphthenic, aromatic, mineral or vegetable oil); water-based, that is the active anti-foam dissolved or emulsified in water; water-extended, that is oil-based antifoam emulsified in water (oil-in-water emulsions); concentrates, that is 100% active antifoam.

The preferred antifoam formulation treatment solution of the present invention comprises one or more low HLB (HLB less than about 10) surfactants in an oil-based solvent. The most preferred solution treatment comprises a glycol ester and an alkyl phenol ethoxylate in an oil solvent. Optionally, an alcohol can be employed in the composition.

The glycol esters are conventionally produced by polymerizing propylene oxide in the presence of an alkaline catalyst. Preferably, the glycol ester is polyethylene glycol monooleate having a molecular weight of about 400 to about 2000, or polyethylene glycol monotallate having a molecular weight of about 200 to about 2000. The preferred glycol esters are polyethylene glycol monooleate, but could be tallate, stearate, laurate and the like, most preferably with a molecular weight of about 400. A representative compound is commercially available from Lonza as PEG 400 MOT.

The alkylphenol ethoxylate compounds generally have the formula:

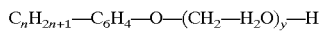

$$C_nH_{2n+1}\text{---}C_6H_4\text{---}O\text{---}(CH_2\text{---}H_2O)_y\text{---}H$$

where y=1 to 12 and n=1 to 12

The glycol ester and alkyl phenol ethoxylate are added to the acidic solution in amounts to provide from about 5 to about 100 parts per million treatment formulation per ton of ore processed in a weight ratio of from about 5:95 to 95:5.

Of the compounds, nonylphenol ethoxylates are preferred with nonylphenol with about six moles ethoxylation most preferred. This compound is commercially available as Triton® N-60 from Rohm & Haas or Tergitol® NP-6 from Union Carbide.

The oil solvent can comprise a paraffinic oil solvent, an aromatic oil solvent or a naphthenic oil solvent. The paraffinic oil solvent is generally selected from those hydrotreated petroleum distillates having 10 to 18 carbon atoms such as mineral oil. Representative solvents are commercially available as Varsol® (believed to be an iso-paraffinic petroleum distillate) or Exxsol® D-40 (believed to be a light hydrogenated petroleum distillate) from EXXON Chemicals.

The solution treatment of the present invention can be added to the aqueous sulfuric acid, copper rich stream fed to an electrowinning operation. When the solution treatment is present in the aqueous, sulfuric acid, copper rich solution fed to an electrowinning operation the creation of an "acid mist" in and around the electrowinning cells is significantly reduced. The solution treatment also reduces "acid mist" during drum agglomeration operations when added to the aqueous sulfuric acid leach solution employed as an agglomeration aid.

The present invention will now be further described with reference to a number of specific examples which are to be regarded as illustrative and not as restricting the scope of the present invention.

EXAMPLE 1

Testing was conducted in the agglomeration drum of a copper recovery operation. Over a period of approximately one year, a treatment comprising a polyethylene glycol monooleate of molecular weight of about 400 and a nonylphenol ethoxylate with about six moles of ethoxylation in a paraffin oil solvent in a concentration of about 35 ppm was added to the aqueous sulfuric acid solution. The generation of acid mist in and around the agglomeration drum operation improved significantly as shown by the acidic aerosol measurements summarized in Table 1.

TABLE 1

| Acidic Aerosol Measurements (ppm) | | |
|---|---|---|
| Measurement Location | With Treatment | Without Treatment |
| Console | 0.17 | 0.37 |
| Drum Discharge | 1.77 | 4.67 |
| Belt Transfer | 3.79 | 8.47 |
| Loading Bridge Cabin | 1.13 | 2.24 |

In addition to the reduction of acidic aerosol, during the testing described above, it was discovered that the temperature of the pregnant leach solution being fed into the electrowinning operation could be increased between 1–4° C. This increased temperature increased the yield of copper from the electrowinning operation.

Furthermore during the testing described above, it was discovered that the treatment of the present invention allowed the concentration of acid in the drum agglomeration operation to be increased by from about 15–29% depending upon the grade of ore being processed. This increase in acid concentration resulted in an increase in copper extraction of from about 10–12%.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of inhibiting the formation of acidic aerosol mist in an agglomeration operation wherein mineral bearing ore is agglomerated with an acidic leach solution comprising adding to the acidic leach solution, prior to agglomeration, an antifoam formulation which exhibits antifoam properties at a solution pH of about pH 1 to 2 selected from the group consisting of fatty amides, glycol esters, fatty esters, polyglycols, silicas, silicons, wax dispersions, fatty acids, fatty alcohols, ethoxylated alkyl phenols, ethylene oxide/propylene oxide block copolymers, and mixtures thereof in an amount sufficient to inhibit acidic aerosol mist formation.

2. The method of claim 1 wherein said antifoam formulation is dissolved in an oil selected from the class consisting of paraffinic oil, naphthenic oil, aromatic oil, mineral oil, vegetable oil or mixtures thereof.

3. The method of claim 2 wherein said antifoam comprises an oil-in-water emulsion.

4. The method of claim 1 wherein said antifoam formulation is dissolved in water.

5. A method of inhibiting the formation of acidic aerosol mist in an acid solution solvent extraction and an electrowinning operation comprising adding to the acid solution of an electrolyte cell an antifoam formulation which exhibits antifoam properties at a solution pH of about pH 1 to 2 selected from the group consisting of fatty amides, glycol esters, fatty esters, polyglycols, silicas, silicons, wax dispersions, fatty acids, fatty alcohols, ethoxylated alkyl phenols, ethylene oxide/propylene oxide block copolymers, and mixtures thereof in an amount sufficient to inhibit acidic aerosol mist formation.

6. The method of claim 5 wherein said antifoam formulation is dissolved in an oil selected from the class consisting of paraffinic oil, naphthenic oil, aromatic oil, mineral oil, vegetable oil or mixtures thereof.

7. The method of claim 6 wherein said antifoam comprises an oil-in-water emulsion.

8. The method of claim 5 wherein said antifoam formulation is dissolved in water.

9. A method of inhibiting the formation of acidic aerosol mist in an acid solution extraction and electrowinning ore recovery operation comprising adding to the acid solution of an electrolytic cell a glycol ester and an alkyl phenol ethoxylate in an oil solvent in an amount sufficient to inhibit acidic aerosol mist formation.

10. The method of claim 9 further comprising adding an alcohol to said acid solution.

11. The method of claim 9 wherein said alkyl phenol ethoxylate has the general formula $C_nH_{2n+1}$—$C_6H_4$—O—($CH_2$—$H_2O)_y$—H where y=1 to 12 and n=1 to 12.

12. The method of claim 11 wherein said alkyl phenol ethoxylate is nonyl phenol ethoxylate.

13. The method of claim 12 wherein said nonyl phenol ethoxylate has about six moles of ethoxylation.

14. The method of claim 9 wherein said glycol ester is selected from the group consisting of polyethylene glycol monooleate and polypropylene glycol monooleate.

15. The method of claim 14 wherein said polypropylene glycol monooleate has a molecular weight of from about 400 to about 2000.

16. The method of claim 14 wherein said polyethylene glycol monooleate has a molecular weight of from about 200 to 2000.

17. The method of claim 9 wherein said glycol ester and alkyl phenol ethoxylate are added to said acid solution in an amount from about 5 to about 100 parts per million per ton of ore processed in a weight ratio of from about 5:95 to 95:5.

18. The method of claim 9 wherein said oil solvent is a paraffinic oil solvent.

19. The method of claim 9 wherein said oil solvent is a naphthenic oil solvent.

20. The method of claim 9 wherein said oil solvent is an aromatic oil solvent.

21. A method of increasing the operable acid concentration and temperature of an acid solution extraction and an electrowinning ore recovery operation comprising adding to the acid solution a glycol ester and an alkyl phenol ethoxylate in an oil solvent.

22. The method of claim 21 further comprising adding an alcohol to said acid solution.

23. The method of claim 21 wherein said alkyl phenol ethoxylate has the general formula $C_nH_{2n+1}$—$C_6H_4$—O—($CH_2$—$H_2O)_y$—H whereby y=1 to 12 and n=1 to 12.

24. The method of claim 23 wherein said alkyl phenol ethoxylate is nonylphenol ethoxylate.

25. The method of claim 24 wherein said nonyl phenol ethoxylate has about six moles of ethoxylation.

26. The method of claim 21 wherein said glycol ester is a polypropylene glycol monooleate.

27. The method of claim 25 wherein said polypropylene glycol monooleate has a molecular weight of from about 400 to about 2000.

28. The method of claim 21 wherein said glycol ester is an polyethylene glycol monooleate.

29. The method of claim 21 wherein said polyethylene glycol monooleate has a molecular weight of from about 200 to about 2000.

30. The method of claim 21 wherein said glycol ester and alkyl phenol ethoxylate are added to said acid solution in an amount from about 5 to about 100 parts per million per ton of ore processed in a weight ratio of from about 5:95 to 95:5.

31. The method of claim 21 wherein said oil solvent is a paraffinic oil solvent.

32. The method of claim 21 wherein said oil solvent is a naphthenic oil solvent.

33. The method of claim 21 wherein said oil solvent is an aromatic oil solvent.

* * * * *